(No Model.)
A. J. BURNS.
PNEUMATIC TIRE.
No. 521,330. Patented June 12, 1894.
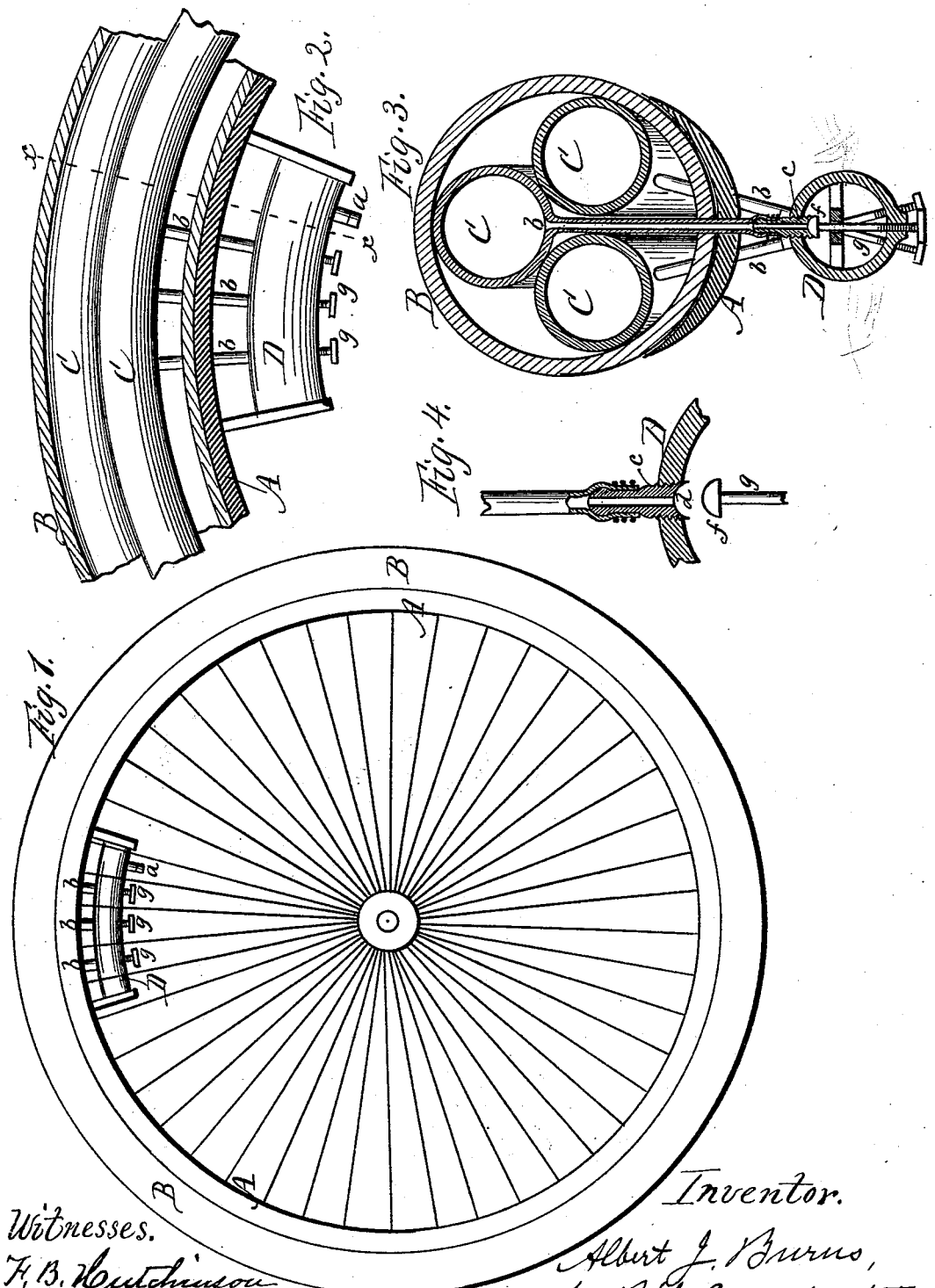
Witnesses.
F. B. Hutchinson
H. G. Osborne
Inventor.
Albert J. Burns,
by R. F. Osgood, Atty.
THE NATIONAL LITHOGRAPHING COMPANY,
WASHINGTON, D. C.

UNITED STATES PATENT OFFICE.

ALBERT J. BURNS, OF FAIRPORT, NEW YORK.

PNEUMATIC TIRE.

SPECIFICATION forming part of Letters Patent No. 521,330, dated June 12, 1894.

Application filed January 4, 1894. Serial No. 495,711. (No model.)

*To all whom it may concern:*

Be it known that I, ALBERT J. BURNS, of Fairport, in the county of Monroe and State of New York, have invented a certain new and useful Improvement in Pneumatic Tires; and I do hereby declare that the following is a full, clear, and exact description of the same, reference being had to the drawings accompanying this application.

My improvement relates to that class in which a set of supplementary tubes are placed inside the main tube, extending circumferentially all the way around, and connected with air supply pipes extending outside the rim, whereby said supplementary tubes can be separately inflated.

The invention consists in the construction and arrangement of parts hereinafter described and embraced in the claim.

In the drawings—Figure 1 is an elevation of a wheel provided with my improvement. Fig. 2 is an enlarged longitudinal section of a portion of the same. Fig. 3 is an enlarged cross section in line $x\ x$ of Fig. 2. Fig. 4 is an enlarged sectional view of one of the air-supply nozzles.

A indicates the rim of the wheel and B the ordinary pneumatic tire or main tube.

C C C are a set of supplementary tubes placed inside the main tube and extending circumferentially all the way around. Any desired number may be used, three being shown in the drawings. It is the design to inflate all these supplementary tubes, by which means a greater degree of elasticity is attained, and in case of the collapse of any one of them the rest will enable the wheel to be used till repairs can be made.

D is a section of tube forming an air reservoir located outside the rim of the wheel and attached thereto by end blocks. It has a nozzle $a$ into which air is forced by an air pump or other means to inflate the air tubes. This air reservoir is connected with all the supplementary tubes by separate pipes $b\ b\ b$ made of the same elastic material and integral with them, said pipes extending through the main tube and rim and connecting with the reservoir by means of metallic nozzles $c\ c\ c$ screwed through the wall of the reservoir, as shown in Figs. 3 and 4. The flexible pipe $b$ is wired or otherwise attached to the nozzle; and the latter is provided, at its inner end, inside the reservoir, with a concave valve seat $d$, into which shuts a convex valve $f$, attached to a screw stem $g$ extending through the opposite side of the reservoir.

To inflate the supplementary tubes the valves are all opened and air is then forced into the reservoir, passing from thence through the nozzles $c\ c\ c$ and pipes $b\ b\ b$ into the tubes. When the proper degree of inflation has been produced the valves are forcibly turned up into their seats making them perfectly tight.

By the construction above described the valve seats and the valves are all located inside the reservoir D, and the connections between the valve seats and the inflatable tubes are made by flexible connections that can be detached at pleasure. When the connections are so detached the reservoir and the tubes, as well as the tire, are entirely disconnected, and either can be removed for repairs or other purposes without affecting the other.

Having described my invention I do not claim simply and broadly a tire provided with supplementary inflatable tubes. Neither do I claim inflating such tubes from a common reservoir. Neither do I claim a valve separate from its seat and forced into same by manual action.

What I claim as new, and desire to secure by Letters Patent, is—

The combination, with the tire A and its supplementary inflatable tubes C C C, of the reservoir D attached to the rim of the wheel but located apart therefrom, the nozzles $c\ c\ c$ screwed through the reservoir, forming valve seats inside the same, the set of independent valves $f\ f$ attached to screw stems $g\ g$ also located inside the reservoir, and the set of flexible pipes $b\ b\ b$ connected with the nozzles and extending to the inflatable tubes, as shown and described and for the purpose specified.

In witness whereof I have hereunto signed my name in the presence of two subscribing witnesses.

A. J. BURNS.

Witnesses:
R. F. OSGOOD,
L. H. JANES.